US011830204B2

(12) United States Patent
Che et al.

(10) Patent No.: US 11,830,204 B2
(45) Date of Patent: Nov. 28, 2023

(54) SYSTEMS AND METHODS FOR PERFORMING MOTION TRANSFER USING A LEARNING MODEL

(71) Applicant: BEIJING DIDI INFINITY TECHNOLOGY AND DEVELOPMENT CO., LTD., Beijing (CN)

(72) Inventors: Zhengping Che, Beijing (CN); Kun Wu, Beijing (CN); Bo Jiang, Beijing (CN); Chengxiang Yin, Beijing (CN); Jian Tang, Beijing (CN)

(73) Assignee: BEIJING DIDI INFINITY TECHNOLOGY AND DEVELOPMENT CO., LTD., Beijing (CN)

( * ) Notice: Subject to any disclaimer, the term of this patent is extended or adjusted under 35 U.S.C. 154(b) by 720 days.

(21) Appl. No.: 17/020,668

(22) Filed: Sep. 14, 2020

(65) Prior Publication Data
US 2021/0390713 A1 Dec. 16, 2021

Related U.S. Application Data

(63) Continuation of application No. PCT/CN2020/095755, filed on Jun. 12, 2020.

(51) Int. Cl.
*G06T 7/246* (2017.01)
*G06N 20/00* (2019.01)
(Continued)

(52) U.S. Cl.
CPC ............ *G06T 7/251* (2017.01); *G06N 3/045* (2023.01); *G06N 20/00* (2019.01); *G06T 7/246* (2017.01); *G06V 10/40* (2022.01); *G06V 10/82* (2022.01)

(58) Field of Classification Search
CPC .......... G06T 7/20; G06T 7/246; G06T 13/40; G06T 19/006; G06T 19/20;
(Continued)

(56) References Cited

U.S. PATENT DOCUMENTS

2016/0224864 A1\* 8/2016 Chang et al. .......... G06V 10/56
2018/0160021 A1\* 6/2018 Zhou et al. .......... H04N 23/634
2019/0172184 A1\* 6/2019 Pan ........................ G06T 7/277

FOREIGN PATENT DOCUMENTS

CN 102682302 A \* 9/2012
CN 104253994 A \* 12/2014
(Continued)

*Primary Examiner* — Andrew W Johns
(74) *Attorney, Agent, or Firm* — BAYES PLLC

(57) ABSTRACT

Embodiments of the disclosure provide systems and methods for performing motion transfer using a learning model. An exemplary system may include a communication interface configured to receive a first image including a first movable object and a second image including a second movable object. The system may also include at least one processor coupled to the communication interface. The at least one processor may be configured to extract a first set of motion features of the first movable object from the first image using a first encoder of the learning model and extract a first set of static features of the second movable object from the second image using a second encoder of the learning model. The at least one processor may also be configured to generate a third image by synthesizing the first set of motion features and the first set of static features.

20 Claims, 6 Drawing Sheets

(51) Int. Cl.
*G06N 3/045* (2023.01)
*G06V 10/40* (2022.01)
*G06V 10/82* (2022.01)

(58) Field of Classification Search
CPC .......... G06T 2207/20081; G06T 2207/20212; G06V 10/40; G06V 10/44; G06V 10/62; G06V 10/80; G06V 10/806; G06V 20/20; G06V 20/46; H04N 5/145; H04N 5/265
See application file for complete search history.

(56) References Cited

FOREIGN PATENT DOCUMENTS

| | | | | |
|---|---|---|---|---|
| CN | 104581437 A | * | 4/2015 | ......... H02N 21/8549 |
| CN | 105187801 A | * | 12/2015 | |
| CN | 106599907 A | * | 4/2017 | ........... G06K 9/6256 |

* cited by examiner

SYSTEMS AND METHODS FOR PERFORMING MOTION TRANSFER USING A LEARNING MODEL

CROSS REFERENCE TO RELATED APPLICATION

This application is a bypass continuation of International Application No. PCT/CN2020/095755, filed on Jun. 12, 2020, entitled "SYSTEMS AND METHODS FOR PERFORMING MOTION TRANSFER USING A LEARNING MODEL," which is hereby incorporated by reference in its entirety.

TECHNICAL FIELD

The present disclosure relates to systems and methods for performing motion transfer using a learning model, and more particularly to, systems and methods for synthesizing a motion information of a first image with a static information of a second image using a learning model.

BACKGROUND

Recent deep generative models have made great progress in synthesizing images with arbitrary object (e.g., human beings) motions and transferring motions of one object to the others. However, existing approaches require generating skeleton images using pose estimators and image processing operations as an intermediary to form a paired data set with the original images when making the motion transfer. The pose estimator first finds the locations of person keypoints and the image processing operation then connects person keypoints to form a skeleton image. Since the image processing operations, which involve drawing a line between two points, are usually not differentiable, the learning networks used by existing methods cannot be trained in an end-to-end manner. This reduces the availability and compatibility of the model and makes the model impractical in many applications.

Moreover, existing approaches fail to leverage the feature level motion and static information of the real image(s) and synthesized image(s). This causes the model to generate inaccurate motion information, making the model difficult to generate suitable motions for the target. For example, the motion information may vary if the limb ratio between the target person and source person is different, e.g., an adult has longer arms and legs than a child does. Besides that, the distance between the person and camera would also alter the ratio of the person displayed in the image.

Embodiments of the disclosure address the above problems by providing methods and systems for synthesizing a motion information of a first image with a static information of a second image using a learning model.

SUMMARY

Embodiments of the disclosure provide a system for performing motion transfer using a learning model. An exemplary system may include a communication interface configured to receive a first image including a first movable object and a second image including a second movable object. The system may also include at least one processor coupled to the interface. The at least one processor may be configured to extract a first set of motion features of the first movable object from the first image using a first encoder of the learning model and extract a first set of static features of the second movable object from the second image using a second encoder of the learning model. The at least one processor may also be configured to generate a third image by synthesizing the first set of motion features and the first set of static features.

Embodiments of the disclosure also provide a method for motion transfer using a learning model. An exemplary method may include receiving, by a communication interface, a first image including a first movable object and a second image including a second movable object. The method may also include extracting, by at least one processor, a first set of motion features of the first movable object from the first image using a first encoder of the learning model and extracting, by the at least one processor, a first set of static features of the second movable object from the second image using a second encoder of the learning model. The method may further include generating, by the at least one processor, a third image by synthesizing the first set of motion features and the first set of static features.

Embodiments of the disclosure further provide a non-transitory computer-readable medium storing instruction that, when executed by one or more processors, cause the one or more processors to perform a method for motion transfer using a learning model. The method may include receiving a first image including a first movable object and a second image including a second movable object. The method may also include extracting a first set of motion features of the first movable object from the first image using a first encoder of the learning model and extracting a first set of static features of the second movable object from the second image using a second encoder of the learning model. The method may further include generating a third image by synthesizing the first set of motion features and the first set of static features.

It is to be understood that both the foregoing general descriptions and the following detailed descriptions are exemplary and explanatory only and are not restrictive of the invention, as claimed.

DETAILED DESCRIPTION

Reference will now be made in detail to the exemplary embodiments, examples of which are illustrated in the accompanying drawings. Wherever possible, the same reference numbers will be used throughout the drawings to refer to the same or like parts.

Figure 1:
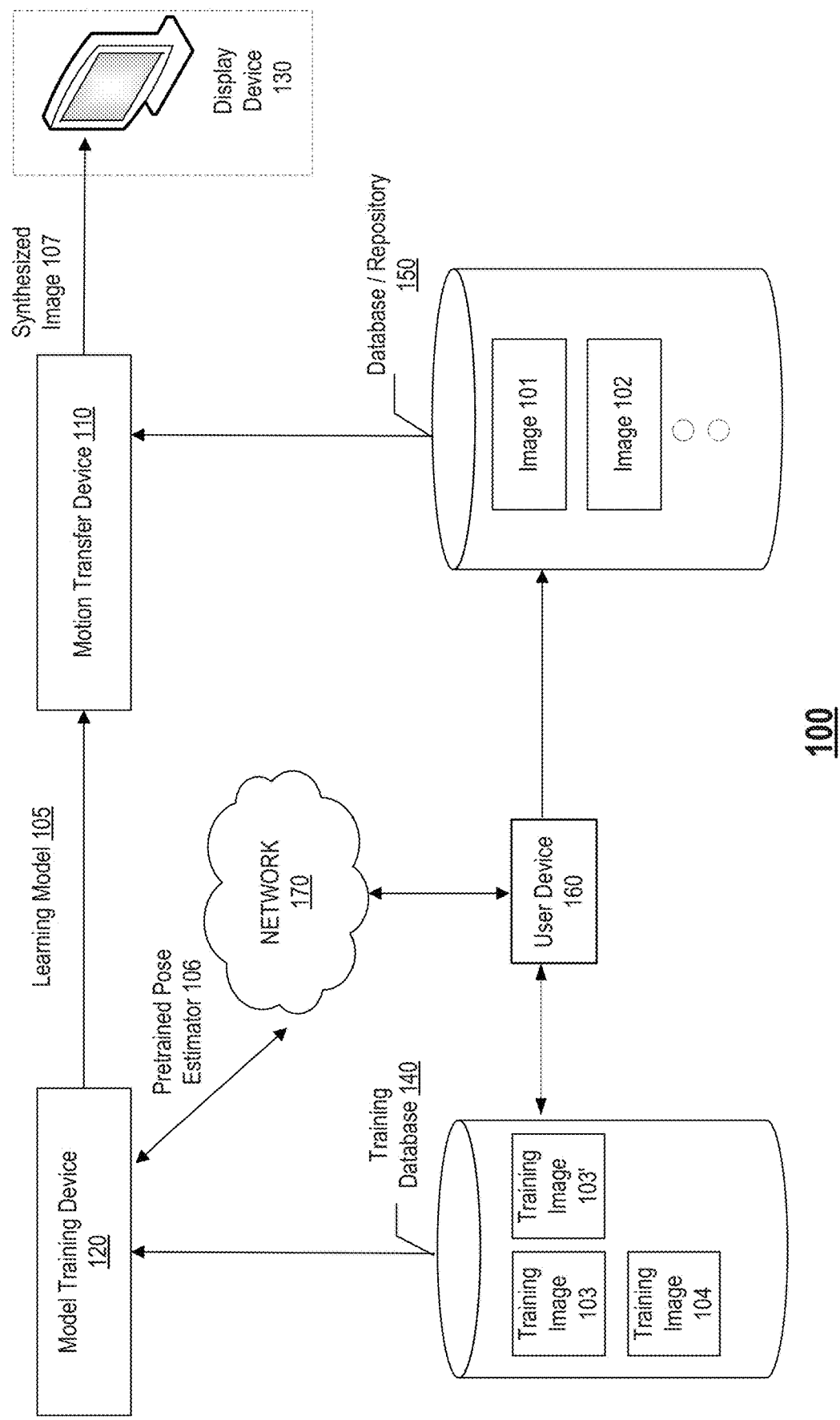
FIG. 1 illustrates a schematic diagram of an exemplary motion transfer system, according to embodiments of the disclosure.

FIG. 1 illustrates a schematic diagram of an exemplary motion transfer system 100, according to embodiments of the disclosure. Consistent with the present disclosure, motion transfer system 100 is configured to transfer motions from one object to another (e.g., transfer the motion of an object in an image 101 to an object in an image 102 received from user device 160) based on a learning model (e.g., a learning model 105) trained by model training device 120 using training data (e.g., a training image 103, a training image 103' and a training image 104). The objects may be movable objects, such as persons, animals, robots, and animated characters, etc. In some embodiments, training image 103 may include/depict the same object as that in training image 103' (e.g., having similar static information but different motion information), and training image 104 may include/depict an object different from the one in training image 103 and training image 103'.

In some embodiments, motion transfer system 100 may include components shown in FIG. 1, including a motion transfer device 110, a model training device 120, a training database 140, a database/repository 150, a user device 160, and a network 170 to facilitate communications among the various components. In some embodiments, motion transfer system 100 may optionally include a display device 130 to display the motion transfer result (e.g., a synthesized image 107). It is to be contemplated that motion transfer system 100 may include more or less components compared to those shown in FIG. 1.

As shown in FIG. 1, motion transfer system 100 may transfer the motion of a first object (e.g., a first human being) included/depicted in image 101 to a second object (e.g., a second human being, being the same or different from the first human being) included/depicted in image 102 using motion transfer device 110.

In some embodiments, motion transfer device 110 may use a motion feature encoder to extract pose information of the first object (e.g., generate keypoint map(s) representing a probability that a keypoint exists at each pixel and part affinity field of a body part of the first object) in image 101. In some embodiments, motion transfer device 110 may further use a static feature encoder to extract static information of the second object (e.g., the appearance and environment background) included/depicted in image 102. In some embodiments, motion transfer device 110 may additionally use an image generator for generating synthesized image 107 using the pose information of the first object and the static information of the second object. In some embodiments, the motion transfer operations may be performed based on learning model 105, trained by model training devise 120. In some embodiments, motion transfer system 100 may display the motion transfer result (e.g., synthesized image 107) on display device 130. In some embodiments, when a learning model (e.g., learning model 105) is pre-trained for motion transfer, motion transfer system 100 may include only motion transfer device 110, database/repository 150, and optionally display device 130 to perform motion transfer related functions.

Motion transfer system 100 may optionally include network 170 to facilitate the communication among the various components of motion transfer system 100, such as databases 140 and 150, devices 110, 120 and 160. For example, network 170 may be a local area network (LAN), a wireless network, a personal area network (PAN), metropolitan area network (MAN), a wide area network (WAN), etc. In some embodiments, network 170 may be replaced by wired data communication systems or devices.

In some embodiments, the various components of motion transfer system 100 may be remote from each other or in different locations and be connected through network 170 as shown in FIG. 1. In some alternative embodiments, certain components of motion transfer system 100 may be located on the same site or inside one device. For example, training database 140 may be located on-site with or be part of model training device 120. As another example, model training device 120 and motion transfer device 110 may be inside the same computer or processing device.

Consistent with the present disclosure, motion transfer system 100 may store images including a movable object (e.g., a human being, an animal, a machine with different moving parts, or an animated character, etc.). For example, images 103 and 103' including/depicting the same object with different motion information. In some embodiments, an image 104 including/depicting an object different from the object in images 103 and 103' may also be stored in training database 140. On the other hand, target and source images for transferring of motions (e.g., images 101 and 102) may be stored in database/repository 150.

The various images (e.g., images 101, 102, 103, 103' and 104) may be images captured by user device 160 such as a camera, a smartphone, or any other electronic device with photo capturing functions, etc. The images may be created/generated by user device 160 using image processing programs or software, e.g., when the object is an animated character. In some embodiments, the images can be a frame extracted from an image sequence in a video clip. The object included/depicted in each image can be any suitable object capable of moving (i.e., capable of transferring a motion to/or from) such as a robot, a machine, a human being, an animal, etc.

In some embodiments, training database 140 may store training images 103 and 103' including/depicting the same object, and training image 104 including/depicting a different object. In some embodiments, training images 103 and 103' may have similar/the same static information (e.g., objects with same appearance but depict from different angles, and/or different background), but different motion information (e.g., different pose and/or location information). Training image 104 may have different static information and motion information than either training image 103 or 103'. In some embodiments, training images 103 or 103' may be used for training learning model 105 based on minimizing a joint loss. In some embodiments, training image 104 may be used as a support image for further improving the generalization ability of learning model 105 by further adding a support loss to the joint loss.

In some embodiments, learning model 105 may have an architecture that includes multiple sub-networks (e.g., a motion feature encoder, a static feature encoder and an image generator). Each sub-network may include multiple convolutional blocks, residual blocks and/or transposed convolution blocks for performing functions such as extracting feature vectors (e.g., representing the motion features and/or the static features) and generating images (e.g., synthesizing the motion features and the static features extracted from different images). For example, the motion feature encoder may include a pose estimator (e.g., a pre-trained VGG-19 network), a keypoint amplifier, and a motion refiner network (e.g., a network having residual blocks) for extracting the motion features. In an example, the static feature encoder may include convolutional blocks with down-sampling modules, and some residual blocks (e.g., 3 convolutional blocks with down-sampling modules and 5 residual blocks) for extracting the static features. In another example, the image generator may include residual blocks and transposed convolution blocks (e.g., 4 residual blocks and 3 transposed convolution blocks) for generating the output image (e.g., synthesized image 107) in the same size as the input images (e.g., images 101 and 102).

In some embodiments, the model training process is performed by model training device 120. It is contemplated that some of the sub-networks of learning model may be pretrained, e.g., ahead of time before the rest parts of the learning model are trained. For example, pose estimator 106 may be pretrained either by model training device 120 or by another device and provided to model training device 120. For example, model training device 120 may receive pretrained pose estimator 106 through network 107, instead of training it jointly with the rest of learning model 105. In some embodiments, pose estimator 106 may be trained for extracting human pose information by estimating keypoints of a human body (e.g., the PoseNet vision model). In some other embodiments, pose estimator 106 may also be trained with specifically designed training set for exacting pose information of living creatures other than a human being (e.g., an animal), a machine capable of moving (e.g., a robot, a vehicle, etc.), or an animated character.

As used herein, "training" a learning model refers to determining one or more parameters of at least one layer of a block in the learning model. For example, a convolutional layer of the static feature encoder may include at least one filter or kernel. One or more parameters, such as kernel weights, size, shape, and structure, of the at least one filter may be determined by e.g., an adversarial-based training process. Consistent with some embodiments, learning model 105 may be trained based on supervised, semi-supervised, or non-supervised methods.

As show in FIG. 1, motion transfer device 110 may receive learning model 105 from model training device 120. Motion transfer device 110 may include a processor and a non-transitory computer-readable medium (not shown). The processor may perform instructions of a motion transfer process stored in the medium. Motion transfer device 110 may additionally include input and output interfaces to communicate with database/repository 150, user device 160, network 170 and/or a user interface of display device 130. The input interface may be used for selecting an image (e.g., image 101 and/or 102) for motion transfer. The output interface may be used for providing the motion transfer result (e.g., synthesized image 107) to display device 130.

Model training device 120 may communicate with training data base 140 to receive one or more set of training data (e.g., training images 103, 103' and 104), and may receive pretrained pose estimator 106 through network 107. Each set of the training data may include training images 103 and 103' including/depicting the same object with different motion information, and training image 104 including/depicting a different object. Model training device 120 may use each training data set received from training database 140 to train learning model 105 (the training process is described in greater detail in connection with FIGS. 5 and 6 below). Model training device 120 may be implemented with hardware specially programmed by software that performs the training process. For example, model training device 120 may include a processor and a non-transitory computer-readable medium (not shown). The processor may conduct the training by performing instructions of a training process stored in the computer-readable medium. Model training device 120 may additionally include input and output interfaces to communicate with training database 140, network 170, and/or a user interface (not shown). The user interface may be used for selecting sets of training data, adjusting one or more parameters of the training process, selecting or modifying a framework of learning model 105, and/or manually or semi-automatically providing training images.

In some embodiments, motion transfer system 100 may optionally include display 130 for displaying the motion transfer result, e.g., synthesized image 107. Display 130 may include a display such as a Liquid Crystal Display (LCD), a Light Emitting Diode Display (LED), a plasma display, or any other type of display, and provide a Graphical User Interface (GUI) presented on the display for user input and data depiction. The display may include a number of different types of materials, such as plastic or glass, and may be touch-sensitive to receive inputs from the user. For example, the display may include a touch-sensitive material that is substantially rigid, such as Gorilla Glass™, or substantially pliable, such as Willow Glass™. In some embodiments, display 130 may be part of motion transfer device 110.

Figure 2:
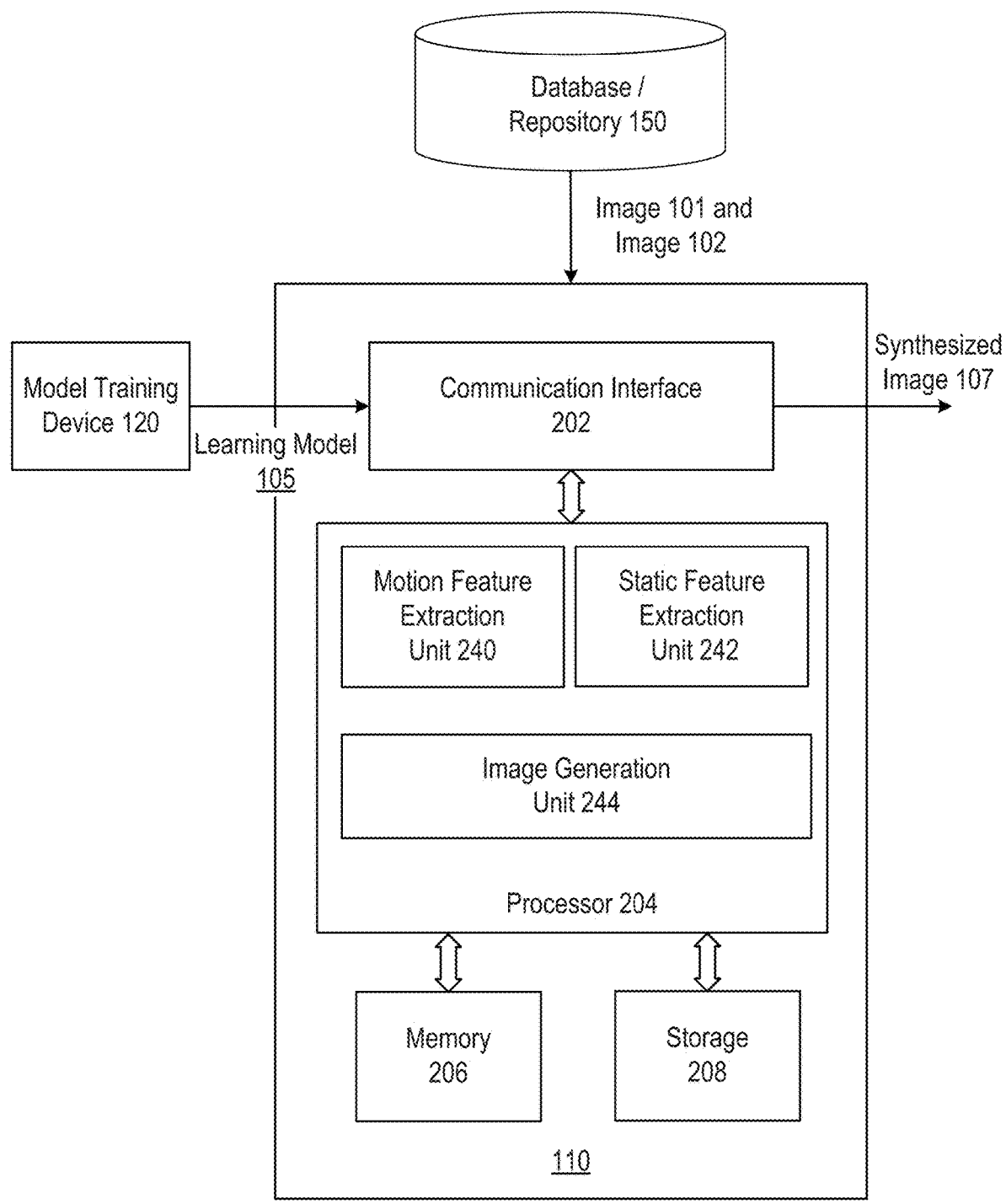
FIG. 2 illustrates a block diagram of an exemplary motion transfer device, according to embodiments of the disclosure.

FIG. 2 illustrates a block diagram of an exemplary motion transfer device 110, according to embodiments of the disclosure. In some embodiments, as shown in FIG. 2, motion transfer device 110 may include a communication interface 202, a processor 204, a memory 206, and a storage 208. In some embodiments, motion transfer device 110 may have different modules in a single device, such as an integrated circuit (IC) chip (e.g., implemented as an application-specific integrated circuit (ASIC) or a field-programmable gate array (FPGA)), or separate devices with dedicated functions. In some embodiments, one or more components of motion transfer device 110 may be located in a cloud or may be alternatively in a single location (such as inside a mobile device) or distributed locations. Components of motion transfer device 110 may be in an integrated device or distributed at different locations but communicate with each other through a network (not shown). Consistent with the present disclosure, motion transfer device 110 may be configured to synthesize motion information (e.g., motion features of the object) extracted from image 101 with static information (e.g., static features of the object) extracted from image 102, and generate synthesized image 107 as an output.

Communication interface 202 may send data to and receive data from components such as database/repository 150, user device 160, model training device 120 and display device 130 via communication cables, a Wireless Local Area Network (WLAN), a Wide Area Network (WAN), wireless networks such as radio waves, a cellular network, and/or a local or short-range wireless network (e.g., Bluetooth™), or other communication methods. In some embodiments, communication interface 202 may include an integrated service digital network (ISDN) card, cable modem, satellite modem, or a modem to provide a data communication connection. As another example, communication interface 202 may include a local area network (LAN) card to provide a data communication connection to a compatible LAN. Wireless links can also be implemented by communication interface 202. In such an implementation, communication interface 202 can send and receive electrical, electromagnetic or optical signals that carry digital data streams representing various types of information.

Consistent with some embodiments, communication interface 202 may receive learning network 105 from model training device 120, and images 101 and 102 to be processed from database/repository 150. Communication interface 202 may further provide images 101 and 102 and learning model 105 to memory 206 and/or storage 208 for storage or to processor 204 for processing.

Processor 204 may include any appropriate type of general-purpose or special-purpose microprocessor, digital signal processor, or microcontroller. Processor 204 may be configured as a separate processor module dedicated to motion transfer, e.g., synthesizing motion information of a first object extracted from one image with static information of a second object extracted from another image using a learning model. Alternatively, processor 204 may be configured as a shared processor module for performing other functions in addition to motion transfer.

Memory 206 and storage 208 may include any appropriate type of mass storage provided to store any type of information that processor 204 may need to operate. Memory 206 and storage 208 may be a volatile or non-volatile, magnetic, semiconductor, tape, optical, removable, non-removable, or other type of storage device or tangible (i.e., non-transitory) computer-readable medium including, but not limited to, a ROM, a flash memory, a dynamic RAM, and a static RAM. Memory 206 and/or storage 208 may be configured to store one or more computer programs that may be executed by processor 204 to perform functions disclosed herein. For example, memory 206 and/or storage 208 may be configured to store program(s) that may be executed by processor 204 to transfer motion based on images 101 and 102.

In some embodiments, memory 206 and/or storage 208 may also store intermediate data such as keypoint heatmaps, part affinity fields of body parts of the object, extracted motion features, and extracted static features, etc. Memory 206 and/or storage 208 may additionally store various sub-learning models (e.g., sub-networks included in learning model 105) including their model parameters and model configurations, such as pre-trained pose estimator 106 (e.g., a pre-trained VGG-19 network), the motion feature extracting blocks (e.g., motion feature encoder) including the keypoint amplifier, the motion refiner, the static feature extracting blocks (e.g., and static feature encoder), and the image generator blocks, etc.

As shown in FIG. 2, processor 204 may include multiple modules, such as a motion feature extraction unit 240, a static feature extraction unit 242, and an image generation unit 244, and the like. These modules (and any corresponding sub-modules or sub-units) can be hardware units (e.g., portions of an integrated circuit) of processor 204 designed for use with other components or software units implemented by processor 204 through executing at least part of a program. The program may be stored on a computer-readable medium, and when executed by processor 204, it may perform one or more functions. Although FIG. 2 shows units 240-244 all within one processor 204, it is contemplated that these units may be distributed among different processors located closely or remotely with each other.

Figure 3:
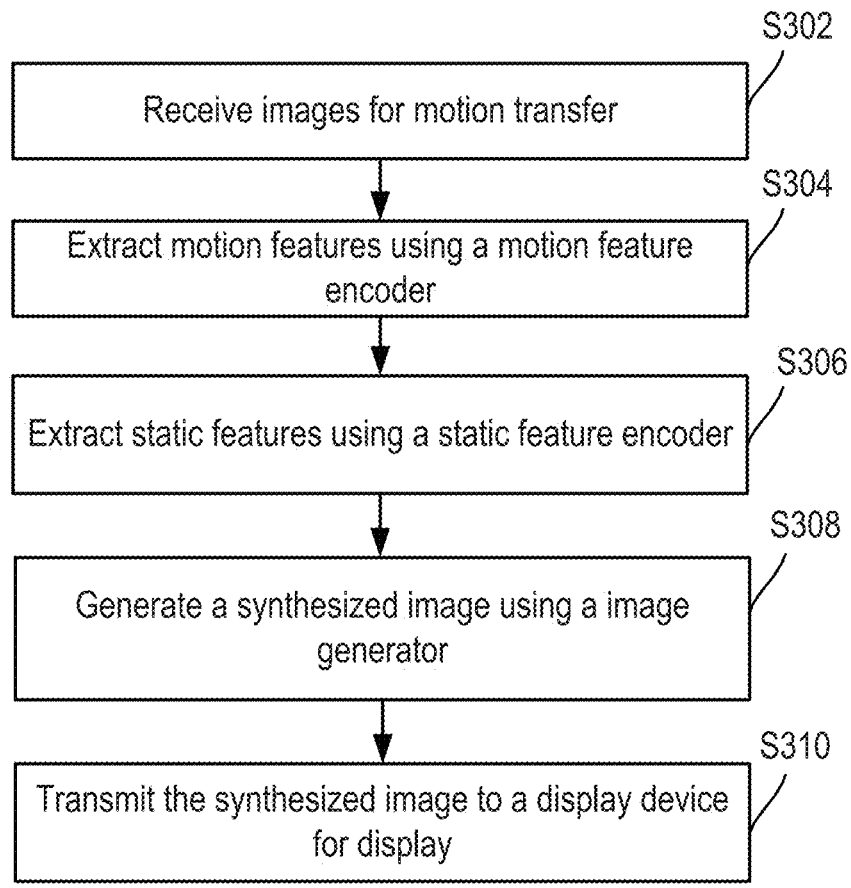
FIG. 3 illustrates a flowchart of an exemplary method for motion transfer, according to embodiments of the disclosure.

In some embodiments, units 240-244 of FIG. 2 may execute computer instructions to perform the motion transfer. For example, FIG. 3 illustrates a flowchart of an exemplary method 300 for motion transfer, according to embodiments of the disclosure. Method 300 may be implemented by motion transfer device 110 and particularly processor 204 or a separate processor not shown in FIG. 2 using learning model 105. Method 300 may include steps S302-S310 as described below. It is to be appreciated that some of the steps may be performed simultaneously, or in a different order than shown in FIG. 3.

In step S302, communication interface 202 may receive images 101 and 102 acquired/generated by user device 160 from database/repository 150. In some embodiments, user device 160 may acquire/generate an image including/depicting an object by using a camera. For example, user device 160 may be a smart phone with a camera configured to take pictures or sequence of pictures (e.g., a video clip). The object may be a living creature (e.g., an animal, a human, etc.) or a machine capable of moving (e.g., a robot, a vehicle, etc.). User device 160 may also generate the image of the object (e.g., an animated character) using image/photo processing software. For example, image 101 and/or 102 may be an image being part of a drawn figure or a sequence of drawn figures (e.g., an animation clip). Database/repository 150 may store the images and transmit the images to communication interface 202 for motion transfer.

Figure 4:
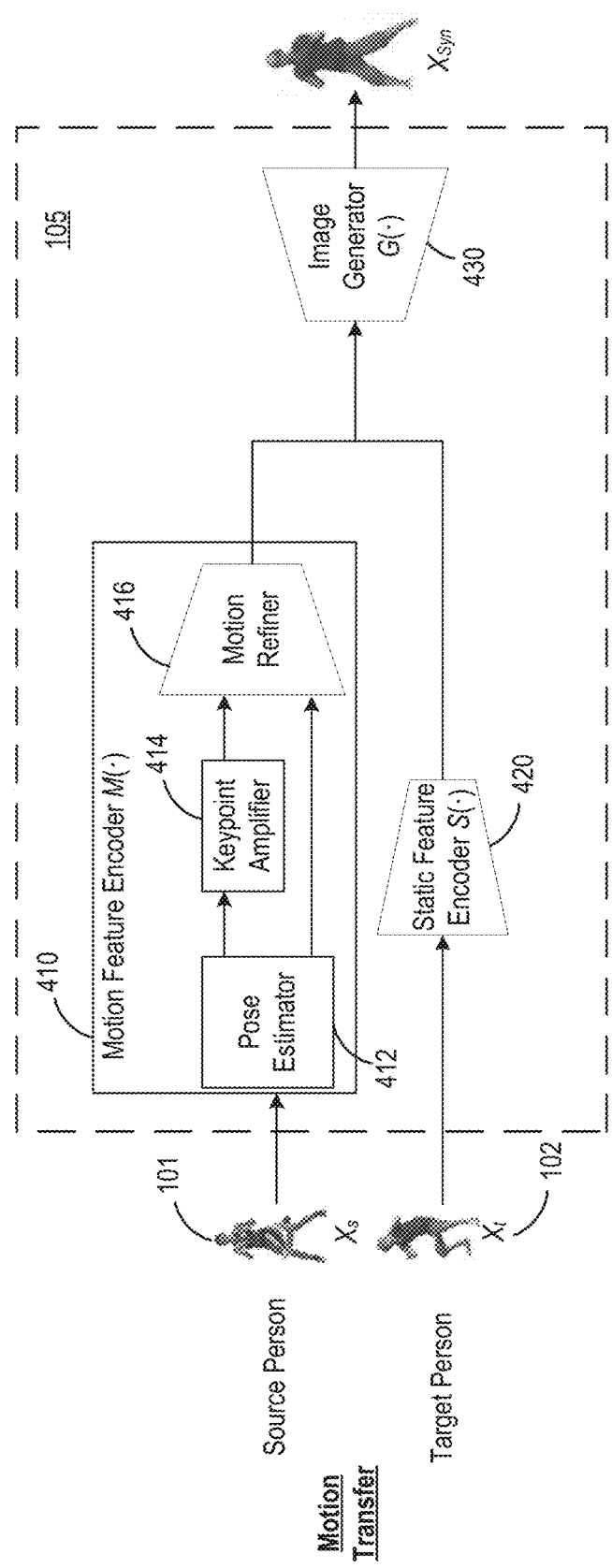
FIG. 4 illustrates a schematic diagram of an exemplary learning model for motion transfer, according to embodiments of the disclosure.

In step S304, motion feature extraction unit 240 may extract motion features (i.e., pose information and location) of a first object included/depicted in image 101 (also referred to as source image $x_s$) using a motion feature encoder. For example, FIG. 4 illustrates a schematic diagram of exemplary learning model 105 for motion transfer, according to embodiments of the disclosure. In the shown embodiments, learning model 105 may include a motion feature encoder 410, a static feature encoder 420, and an image generator 430.

In some embodiments, as shown in FIG. 4, motion feature encoder 410 may include a pose estimator 412 (e.g., pre-trained pose estimator 106), a keypoint amplifier 414 and a motion refiner 416. For example, pose estimator 412 may extract keypoint heatmaps $$h \in R^{18 \times} \frac{H}{8} \times \frac{W}{8}$$

of the object representing a probability that a keypoint exists at each pixel, and part affinity fields $$p \in R^{38 \times} \frac{H}{8} \times \frac{W}{8}$$

of different body parts of the object showing the orientation of the body part. In some embodiments, p may have 38 (19×2) channels, and can be a set of 2D vectors indicating the location and orientation by x-y coordinates for each channel of the keypoint heatmap h. In some embodiments, the generated keypoint heatmap h may only keep the first 18 of total 19 channels and discard the last channel (e.g., the heatmap of the background). Both h and p may be downsampled multiple times in order to reduce the size of the image. For example, both h and p may be downsampled in half for 3 times, resulting in an image $\frac{1}{2}^3$ the size of the original input images (e.g., images 101 and 102). In some embodiments, the keypoints may correspond to joints of the object, such as elbows, wrists, etc. of a human being.

In some embodiments, keypoint amplifier 414 may denoise the extracted keypoint heatmap values and obtain the amplified the keypoint heatmap h'. For example, keypoint amplifier 414 may apply a softmax function with a relatively small temperature T as the keypoint amplifier to the keypoint heatmap h according to equation (1):

$$h' = \text{softmax}\left(\frac{1}{T} \cdot h\right) \qquad (1)$$

For example, T can be set as 0.01 such that the gap between large values and small values in the keypoint heatmap h can be enlarged. This can reduce the effect caused by the noise.

In some embodiments, motion refiner 416 may generate the encoded motion feature vector $M(x_s)$ representing the motion feature of the object based on refining both the part affinity fields p and the amplified keypoint heatmaps h'. For example, motion refiner 416 may include 5 residual blocks. Accordingly, the motion features extracted from pose estimator 412 may be refined such that the influence caused by different body part ratios (e.g., limb ratios) and/or camera angles and/or distances can be reduced.

In step S306, static feature extraction unit 420 may extract static features $S(x_t)$ (e.g., appearance and environment background) of a second object included in image 102 (also referred to as target image $x_t$). In some embodiments, static feature extraction unit 420 may apply a static encoder 420 for extracting the background, the appearance, etc., of the second object. For example, static encoder 420 may include 3 convolutional blocks with down-sampling modules and 5 residual blocks.

In step S308, image generation unit 244 may generate synthesized image 107 by synthesizing the motion features $M(x_s)$ extracted from image 101 and the static features $S(x_t)$ extracted from image 102. For example, image generation unit 244 may apply an image generator 430 to $M(x_s)$ and $S(x_t)$ according to equation (2):

$$x_{syn}, G(S(x_t), M(x_s)), \quad (2)$$

where G(•) represents a function performed by image generator 430 and $x_{syn}$ represents synthesized image 107. In some embodiments, image generator 430 may include 4 residual blocks and 3 transposed convolution blocks such that the output of image generator 430 (e.g., synthesized image 107) may have the same size as that of the input images (e.g., image 101 and/or 102).

In step S310, the output of image generator 430 (e.g., synthesized image 107) may be transmitted to display device 130 for display.

Figure 5:
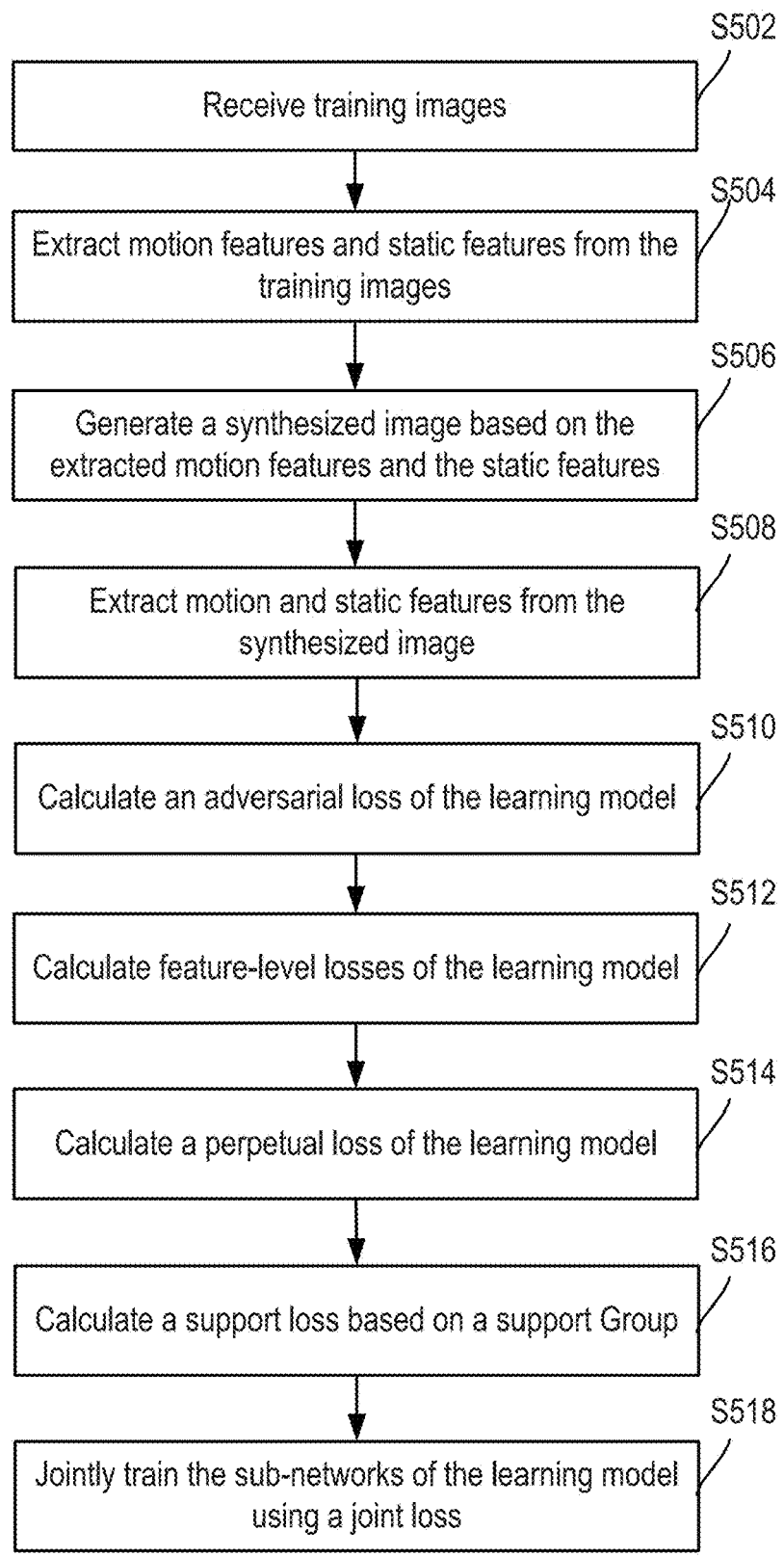
FIG. 5 illustrates a flowchart of an exemplary method for training the exemplary learning model, according to embodiments of the disclosure.

In some embodiments, learning model 105 may be trained by model training device 120 before being used by motion transfer device 110 for motion transfer. For example, FIG. 5 illustrates a flowchart of an exemplary method 500 for training learning model 105, according to embodiments of the disclosure. Method 500 may be implemented by model training device 120 for training learning model 105. Method 500 may include steps S502-S518 as described below. It is to be appreciated that some of the steps may be performed simultaneously, or in a different order than shown in FIG. 5.

In some embodiments, learning model 105 may be trained using training images 103 (e.g., including a target object $x_t$) and 103' (e.g., including a source object $x_s$) that include a same object (e.g., target object $x_t$ and source object $x_s$ being a same movable object in the training images) in the same environment (e.g., same place, same lighting condition, etc.) with different motion information. In some embodiments, images 103 and 103' may be extracted from the same video clip. As the same object in images 103 and 103' may have similar static information (e.g., having the same appearance, but different in camera angles for taking the appearance and/or having different backgrounds in images 103 and 103'), i.e., $S(x_t) \simeq S(x_s)$, learning model 105 may be trained on premises that the motion features extracted from the synthesized image may be a reconstruction of (e.g., approximately equals to) the motion features extracted from image 103', i.e., $M(x_{syn}) \simeq M(x_s)$.

In some embodiments, model training device 120 may further adopt a support group during the training, to further improve the generalization ability/performance and stability of learning model 105. The support group may include an image (e.g., image 104) depicting an object different from that in images 103 and 103' to train learning model 105.

Figure 6:
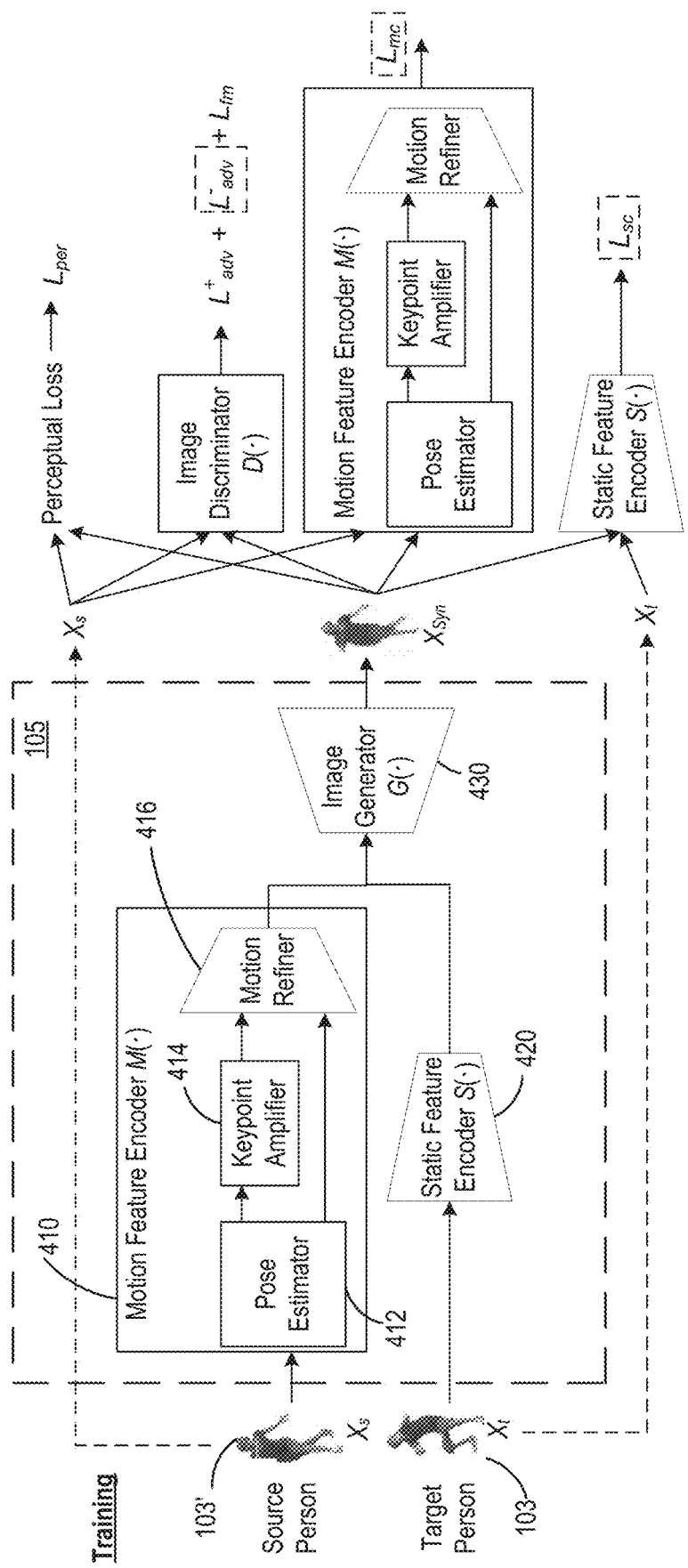
FIG. 6 illustrates a schematic diagram illustrating training of an exemplary learning model, according to embodiments of the disclosure.

Specifically, as illustrated in FIG. 5, in step S502, model training device 120 may receive training images 103 and 103' that include/depict a same object in the same environment with different motion information. For example, FIG. 6. illustrates a schematic diagram illustrating training an exemplary learning model 105, according to embodiments of the disclosure. As illustrated in FIG. 6, image 103 may include a target object $x_t$ (e.g., target person $x_t$) and image 103' may include a source object $x_s$ (e.g., source person $x_s$). The background of each image is not shown in FIG. 6 for simplification and illustrative purposes. In some embodiments, to train learning model 105, images 103 and 103' are selected such that target person $x_t$ and source person $x_s$ are the same person in the same environment. Accordingly, images 103 and 103' may have similar/same static information (e.g., having the same appearance, but different in camera angles for taking the appearance and/or having different backgrounds in images 103 and 103'), i.e., $S(x_t) \simeq S(x_s)$. However, the same person may have different gestures or movements so that images 103 and 103' may contain different motion information.

In step S504, the motion features $M(x_s)$ of source person $x_s$, and the static features $S(x_t)$ of the target person $x_t$, are extracted from images 103' and 103 respectively, using motion feature encoder 410 and static feature encoder 420 of learning model 105, similar to steps S304 and S306 in method 300.

In step S506, a synthesized image (e.g., including/depicting a synthesized object $x_{syn}$, synthesized based on the motion features of $x_s$ and the static features of $x_t$) may be generated using image generator 430 of learning model 105, similar to step S308 in method 300.

In step S508, motion features and static features of synthesized object $x_{syn}$, $M(x_{syn})$ and $S(x_{syn})$ may be extracted from the synthesized image using motion feature encoder 410 and static feature encoder 420 of learning model 105 respectively, similar to steps S304 and S306 in method 300.

In step S510, model training device 120 may implement an adversarial-based training approach. In some embodiments, model training device 120 may calculate an adversarial loss $L_{adv}$ to discern image 103' (e.g., including/depicting the source object $x_s$) and the synthesized image (e.g., including/depicting the synthesized object $x_{syn}$). For example, model training device 120 may apply an image discriminator D to discern between the real sample source object $x_s$ and the synthesized object $x_{syn}$, conditioned on the motion features $M(x_s)$ extracted from the source image (image 103'). In some embodiments, image discriminator D may take image 103' as a real sample labeled with 1 and the synthesized image as a fake sample labeled with 0, where $D(x_s, M(x_s))=1$ and $D(x_{syn}, M(x_s))=0$. For example, the adversarial loss can be calculated according to equations (3), (4) and (5):

$$\mathcal{L}_{adv} = -(\mathcal{L}_{adv}^+ + \mathcal{L}_{adv}^-), \quad (3)$$

where $$\mathcal{L}_{adv}^+ = \log D(x_s, M(x_s)), \quad (4)$$

$$\mathcal{L}_{adv}^- = \log(1 - D(x_{syn}, M(x_s))). \quad (5)$$

In some embodiments, image discriminator D may be a multi-scale discriminator D=(D$_1$, D$_2$). In some embodiments, a discriminator feature matching loss L$_{fm}$ may be calculated. In some embodiments, the discriminator feature matching loss L$_{fm}$ may be calculated based on a weighted sum of multiple feature losses from each of the different layers of image discriminator D. For example, image discriminator D may include 5 different layers and discriminator feature matching loss L$_{fm}$ may be the weighted sum of a L$_1$ distance between the corresponding features of x$_s$ and x$_{syn}$ at each layer of image discriminator D.

In step S512, model training device 120 may calculate feature-level consistency losses indicative of a difference between features extracted from the synthesized image (e.g., the motion features and the static features) and the corresponding features extracted from images 103 and 103'. This may insure that the synthesized object (e.g., x$_{syn}$) has the same static features of the target object (e.g., x$_t$ from image 103) and the same motion features as the source object (e.g., x$_s$ from image 103'). For example, model training device 120 may calculate a motion consistency loss L$_{mc}$ indicating a difference (e.g., a L$_1$ distance) between the motion features extracted from the synthesized image and the motion features extracted from image 103'. Similarly, model training device 120 may calculate a static consistency loss L$_{sc}$ indicating a difference (e.g., a L$_1$ distance) between the static features extracted from the synthesized image and the static features extracted from image 103. For example, the motion consistency loss and the static consistency loss can be calculated according to equations (6) and (7):

$$\mathcal{L}_{mc} = \|M(x_{syn}) - M(x_s)\|_1, \quad (6)$$

$$\mathcal{L}_{sc} = \|S(x_{syn}) - S(x_t)\|_1. \quad (7)$$

In step S514, model training device 120 may calculate a perpetual loss L$_{per}$ based on image 103' and the synthesized image. In some embodiments, the perpetual loss may be calculated using a pre-trained deep convolutional network for object recognition (e.g., a VGG network). The perpetual loss may be added to the full object to improve the stability and quality of the training.

In step S516, model training device 120 may further calculate a support loss based on a support set. In some embodiments, the support set may include images of different objects as the source object for training, e.g., image 104 including an object different from that of images 103 and 103'. Images in the support set provide many kinds of unseen motions and various static information. In some embodiments, a support loss L$_{sup}$ may be calculated using the support set (e.g., image 104) as a target image (e.g., including a target object).

When training with the support set, because the objects included in the target image x$_t$ and the source image x$_s$ are different, they do not share the same static features, i.e., S(x$_t$)≠S(x$_s$). Meanwhile, the synthesized image x$_{syn}$ obtained based on the support set may not be a reconstruction of the source image x$_s$. Accordingly, when calculating the support loss L$_{sup}$, the ground truth image of the target object performing the motion of the source object is not available. Thus, L$^+_{adv}$, L$_{fm}$ and L$_{per}$ for calculating the support loss L$_{sup}$ are not available. In some embodiments, the support loss L$_{sup}$ may include a feature-level consistency loss L$_{mc}$ indicative of a difference between the motion features extracted from the synthesized image and the motion features extracted from source image 103'. In some embodiments, the support loss may further include a feature-level consistency loss L$_{sc}$ indicative of a difference between the static features extracted from the synthesized image and the static features extracted from target image 103. In some embodiments, the support loss may also include a negative adversarial loss L$^-_{adv}$ determined based on the image 103' and the synthesized image. In some embodiments, the support loss L$_{sup}$ may be calculated as a weighted sum of L$_{sc}$, L$_{mc}$ and L$^-_{adv}$.

In step S518, model training device 120 may train learning model 105 by jointly training the sub-networks of learning model 105 (e.g., jointly training keypoint amplifier 414, motion refiner network 416, static feature encoder 420 and image generator 430) based on minimizing the joint loss. In some embodiments, pre-trained pose estimator 106 may remain the same throughout the optimization process. For example, model training device 120 may minimize a joint loss L$_{full}$ that includes some or all of the losses calculated above. In some embodiments, the joint loss L$_{full}$ may be a weighted sum of L$_{adv}$, L$_{fm}$, L$_{per}$, L$_{mc}$ and L$_{sc}$. For example, the joint loss L$_{full}$ may be calculated according to equation (8):

$$\mathcal{L}_{full} = \lambda_{adv}\mathcal{L}_{adv} + \lambda_{fm}\mathcal{L}_{fm} + \lambda_{per}\mathcal{L}_{per} + \lambda_{mc}\mathcal{L}_{mc} + \lambda_{sc}\mathcal{L}_{sc} \quad (8)$$

where $\lambda_{adv}$, $\lambda_{fm}$, $\lambda_{per}$, $\lambda_{mc}$ and $\lambda_{sc}$ are the weights assigned for the respective losses, as calculated in previous steps. In some embodiments, the weights may be selected to reflect the relative importance of the respective losses. For example, $\lambda_{adv}$, $\lambda_{fm}$, $\lambda_{per}$, $\lambda_{mc}$ and $\lambda_{sc}$ may be set to 1, 10, 10, 0.1, 0.01 respectively.

In some embodiments, the support loss L$_{sup}$ calculated in step S518 may be added to the joint loss in order to improve the generalization ability of learning model 105. For example, when training learning model 105, the support loss L$_{sup}$ may be calculated as a weighted sum of L$_{sc}$, L$_{mc}$ and L$^-_{adv}$ according to equation (9) and be added to the joint loss L$_{full}$ of equation (8):

$$\mathcal{L}_{sup} = \lambda_{sup}(\lambda_{adv}\mathcal{L}^-_{adv} + \lambda_{mc}\mathcal{L}_{mc} + \lambda_{sc}\mathcal{L}_{sc}) \quad (9)$$

where $\lambda_{sc}$, $\lambda_{mc}$, and $\lambda_{adv}$ are the weights for L$_{sc}$, L$_{mc}$ and L$^-_{adv}$ respectively and $\lambda_{sup}$ represents the weight assigned to support loss L$_{sup}$ when calculating the joint loss L$_{full}$. For example, the weight $\lambda_{sup}$ can be set to 0.001 while other weights may remain the same as for calculating the overall objective joint loss L$_{full}$.

Another aspect of the disclosure is directed to a non-transitory computer-readable medium storing instruction which, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

It will be apparent to those skilled in the art that various modifications and variations can be made to the disclosed system and related methods. Other embodiments will be apparent to those skilled in the art from consideration of the specification and practice of the disclosed system and related methods.

It is intended that the specification and examples be considered as exemplary only, with a true scope being indicated by the following claims and their equivalents.

What is claimed is:

1. A system for performing motion transfer using a learning model, comprising:
   a communication interface configured to receive a first image including a first movable object and a second image including a second movable object; and
   at least one processor coupled to the communication interface and configured to:
      extract a first set of motion features of the first movable object from the first image using a first encoder of the learning model;
      extract a first set of static features of the second movable object from the second image using a second encoder of the learning model; and
      generate a third image by synthesizing the first set of motion features and the first set of static features.

2. The system of claim 1, wherein the first encoder of the learning model includes a pretrained pose estimator configured to extract pose information of the first movable object and a motion refiner configured to generate a motion feature vector representing the first set of motion features.

3. The system of claim 2, wherein to extract the first set of motion features from the first image, the pretrained pose estimator is further configured to:
   determine a keypoint heatmap representing a probability that a keypoint exists at each pixel; and
   determine a part affinity field of a body part of the first movable object.

4. The system of claim 3, wherein to extract the first set of motion features from the first image, the first encoder further includes a keypoint amplifier configured to amplify the keypoint heatmap.

5. The system of claim 4, wherein to generate the motion feature vector, the motion refiner is further configured to:
   refine the amplified keypoint heatmap and the part affinity field.

6. The system of claim 1, wherein the learning model is trained using a joint loss comprising an adversarial loss and at least one feature-level consistency loss.

7. The system of claim 6, wherein the adversarial loss is determined by applying an image discriminator to discern between the first image and the third image, conditioned on the first set of motion features extracted from the first image.

8. The system of claim 7, wherein the image discriminator comprises multiple layers, and wherein the joint loss further comprises:
   a discriminator feature matching loss indicative of a weighted sum of differences between corresponding features of the first image and the third image at each layer of the image discriminator.

9. The system of claim 6, wherein the at least one feature-level consistency loss further comprises:
   a first feature-level consistency loss indicative of a difference between a second set of motion features extracted from the third image and the first set of motion features extracted from the first image; and
   a second feature-level consistency loss indicative of a difference between a second set of static features extracted from the third image and the first set of static features extracted from the second image.

10. The system of claim 6, wherein the joint loss further comprises:
    a perceptual loss determined based on applying a pretrained deep convolutional network for object recognition to the first and the third images.

11. The system of claim 1, wherein the learning model is trained using a support set including a fourth image including a third movable object different from the first object or the second object.

12. The system of claim 11, wherein the learning model is trained using a support loss determined based on the fourth image, wherein the support loss comprises:
    a third feature-level consistency loss indicative of a difference between a third set of motion features extracted from the fourth image and the first set of motion features extracted from the first image;
    a fourth feature-level consistency loss indicative of a difference between a third set of static features extracted from the fourth image and the first set of static features extracted from the second image; and
    a negative adversarial loss determined based on the first image and the fourth image.

13. The system of claim 12, wherein the support loss is a weighted sum of the third feature-level consistency loss, the fourth feature-level consistency loss, and the negative adversarial loss.

14. A method for motion transfer using a learning model, comprising:
    receiving, by a communication interface, a first image including a first movable object and a second image including a second movable object;
    extracting, by at least one processor, a first set of motion features of the first movable object from the first image using a first encoder of the learning model;
    extracting, by the at least one processor, a first set of static features of the second movable object from the second image using a second encoder of the learning model; and
    generating, by the at least one processor, a third image by synthesizing the first set of motion features and the first set of static features.

15. The method of claim 14, further comprising:
    determining a keypoint heatmap representing a probability that a keypoint exists at each pixel; and
    determining a part affinity field of a body part of the first movable object.

16. The method of claim 15, further comprising:
    amplifying the keypoint heatmap using an amplifier; and
    generating a motion vector representing the first set of motion features based on refine the amplified keypoint heatmap and the part affinity field.

17. The method of claim 14, wherein the learning model is trained using a joint loss comprising an adversarial loss and at least one feature-level consistency loss.

18. The method of claim 17, wherein the at least one feature-level consistency loss further comprises:
    a first feature-level consistency loss indicative of a difference between a second set of motion features extracted from the third image and the first set of motion features extracted from the first image; and
    a second feature-level consistency loss indicative of a difference between a second set of static features extracted from the third image and the first set of static features extracted from the second image.

19. The method of claim 14, wherein the learning model is trained using a support set including a fourth image including a third movable object different from the first object or the second object.

20. A non-transitory computer-readable medium storing instructions that, when executed by one or more processors, cause the one or more processors to perform a method for motion transfer using a learning model, comprising:

receiving a first image including a first movable object and a second image including a second movable object;

extracting a first set of motion features of the first movable object from the first image using a first encoder of the learning model;

extracting a first set of static features of the second movable object from the second image using a second encoder of the learning model; and generating a third image by synthesizing the first set of motion features and the first set of static features.

* * * * *